(12) United States Patent
Koninckx et al.

(10) Patent No.: US 7,037,640 B2
(45) Date of Patent: May 2, 2006

(54) IMAGE STORAGE PHOSPHOR OR SCINTILLATOR PANELS COATED ONTO FLEXIBLE SUPPORTS

(75) Inventors: Jan Koninckx, Mol (BE); Paul Leblans, Kontich (BE); Johan Lamotte, Rotselaar (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 10/885,336

(22) Filed: Jul. 6, 2004

(65) Prior Publication Data
US 2005/0003295 A1    Jan. 6, 2005

Related U.S. Application Data

(60) Provisional application No. 60/501,234, filed on Sep. 8, 2003.

(30) Foreign Application Priority Data

Jul. 4, 2003   (EP) .................................. 03102002

(51) Int. Cl.
G21K 4/00     (2006.01)
G03C 5/16     (2006.01)
G03C 5/17     (2006.01)
G03C 1/765    (2006.01)

(52) U.S. Cl. ..................... 430/496; 430/21; 430/139; 250/484.4; 427/307; 427/309

(58) Field of Classification Search ................ 430/21, 430/496, 139; 250/484.4; 427/307, 309
See application file for complete search history.

(56) References Cited

U.S. PATENT DOCUMENTS

| | | | |
|---|---|---|---|
| 4,733,089 A | | 3/1988 | Kitada et al. ............ 250/483.1 |
| 4,769,549 A | | 9/1988 | Tsuchino et al. ......... 250/484.1 |
| 4,851,690 A | * | 7/1989 | Teraoka ................... 250/484.4 |
| 5,055,681 A | | 10/1991 | Tsuchino et al. ......... 250/327.2 |
| 6,376,844 B1 | * | 4/2002 | Tasaki et al. ............. 250/484.4 |
| 2002/0041977 A1 | * | 4/2002 | Iwabuchi et al. ........... 428/690 |
| 2003/0066972 A1 | * | 4/2003 | Leblans et al. .......... 250/484.4 |
| 2003/0071228 A1 | | 4/2003 | Bergh et al. ............. 250/484.4 |
| 2003/0134087 A1 | * | 7/2003 | Joly et al. .................... 428/143 |
| 2003/0160187 A1 | * | 8/2003 | Nakano et al. ........... 250/484.4 |

FOREIGN PATENT DOCUMENTS

EP   1 113 458    4/2001

OTHER PUBLICATIONS

EP 03 10 2002 European Search Report, Jan. 9, 2004, Korb.

* cited by examiner

*Primary Examiner*—Richard L. Schilling
(74) *Attorney, Agent, or Firm*—Joseph T. Guy; Nexsen Pruet, LLC

(57) ABSTRACT

A phosphor or scintillator sheet, web or panel is provided, wherein a phosphor or a scintillator layer is coated onto a flexible substrate, the stiffness of which is lowered by presence of pits or grooves onto said substrate, preferably applied by a technique selected from the group consisting of mechanical, chemical, (laser) optical, electrical and photo-etching techniques.

44 Claims, 1 Drawing Sheet

IMAGE STORAGE PHOSPHOR OR SCINTILLATOR PANELS COATED ONTO FLEXIBLE SUPPORTS

The application claims the benefit of U.S. provisional application No. 60/501,234 file Sep. 8, 2003.

FIELD OF THE INVENTION

The present invention relates to phosphor or scintillator sheet, web or panel having a support, made flexible in order to provide better manutention and to a method of making it flexible.

BACKGROUND OF THE INVENTION

In radiography the interior of objects is reproduced by means of penetrating radiation, which is high energy radiation also known as ionizing radiation belonging to the class of X-rays, γ-rays and high-energy elementary particle rays, e.g. β-rays, electron beam or neutron radiation.

For the conversion of penetrating radiation into visible light and/or ultraviolet radiation "luminescent" substances, called "phosphors", are used. Cathode luminescent phosphors employed e.g. in CRT screens exhibit two related luminescent characteristics: fluorescence and phosphorescence. Fluorescence is the luminescent emission of light released from the phosphor during the time of excitation by high energy radiation as from X-rays. Phosphorescence is the emission of light from the phosphor occurring after the cessation of high energy excitation. The time of phosphorescence, or rate of decay of afterglow, is denoted as persistence, usually expressed as a measurement of time required for the phosphorescence in order to reduce or decay to a ten percent level of steady-state fluorescent brightness.

In known X-ray image intensifiers for example as disclosed in U.S. Pat. No. 3,838,273, the input screen comprises a substrate such as glass or aluminum on which is deposited an X-ray sensitive radiation conversion layer, commonly referred to as a fluorescence layer or scintillator.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays. In practice the light emitted imagewise by said screen irradiates a contacting photographic silver halide emulsion layer film which after exposure is developed to form therein a silver image in conformity with the X-ray image.

As described e.g. in U.S. Pat. No. 3,859,527 an X-ray recording system has meanwhile been developed wherein photostimulable storage phosphors are used having, in addition to their immediate light emission (prompt emission) on X-ray irradiation, the property to store temporarily a large part of the X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals. A storage screen or panel coated with such phosphors is exposed to an incident pattern-wise modulated X-ray beam and as a result thereof energy is temporarily stored in the coated storage phospors, corresponding with the X-ray radiation pattern. At some interval after the exposure, a beam of visible or infra-red light scans the panel in order to stimulate the release of stored energy as light that is detected and converted to sequential electrical signals which are processed to produce a visible image. Stimulation light can be transformed into an electric signal by making use of a photoelectric conversion element such as e.g. a photo-multiplier. It is clear that the phosphor should store as much as possible of the incident X-ray energy and emit as little as possible of the stored energy until stimulated by the scanning beam. This is called "digital radiography" or "computed radiography" (CR).

Recently, in the hospitals the tendency is increasing to obtain X-ray images on computer monitor immediately after X-ray exposure of the patient. By storing and transmitting that digitized information efficiency and speed of diagnosis is enhanced. Accordingly "direct radiography" (DR) providing directly digital diagnostic X-ray images, after exposure of an adapted detector panel in a radiographic apparatus, becomes preferred instead of the conventional screen/film system. The X-ray quanta are transformed into electric signals by making use of a solid-state flat detector as "image pick-up" element. Such a flat detector is commonly called a "flat panel detector" and is two-dimensionally arranged. Making use therein of a photoconductive material as a detecting means, such as a-Se, in which the negative electrical charge of an electron and the positive electrical charge of a hole are generated by the X-ray energy, said X-ray energy is directly converted into those separated electrical charges. The electrical charge thus obtained is read out as an electric signal by the read-out element, two-dimensionally arranged in a fine area unit.

Furtheron an indirect type flat panel detector is known, in which the X-ray energy is converted into light by a scintillator, and in which the converted light is converted into the electric charge by the photoelectric conversion element such as a-Si two-dimensionally arranged in a fine area unit. The electrical charge is read out again as an electric signal by the photoelectric conversion read-out element, two-dimensionally arranged in a fine area unit.

Moreover a direct radiography detector is known in which the X-ray energy is converted into light by a scintillator, and wherein the converted light is projected on one or more CCD or CMOS sensors which are arranged matrix-wise in the same plane, through a converging body such as a lens or optical fiber. In the inside of the CCD or CMOS sensor, via photoelectric conversion, and charge-voltage conversion, an electric signal is obtained in every pixel.

This type of detector is also defined, therefore, as a solid state plane detector.

The image quality that is produced by any radiographic system using phosphor screen or panel, and more particularly, within the scope of the present invention, in a digital radiographic system, largely depends upon the construction of the phosphor screen. Generally, the thinner a phosphor screen at a given amount of absorption of X-rays, the better the image quality will be.

It is further clear that a flat phosphor screen is highly desired in order to provide a homogeneous image from a point of view of sensitivity, of noise and of image definition, also called sharpness. In view of an economically justified coating method of a phosphor or a scintillator layer onto a flexible substrate as described in EP-Applications Nos. 03 100 723, filed Mar. 20, 2003, and 04 101 138, filed Mar. 19, 2004, it is clear that said coating method within a sealed zone maintained under vacuum conditions, essentially comprising the step of vapor deposition of said phosphor or scintillator layer onto a substrate, lays burden on the choice of said flexible substrate. So in order to allow deformation at least before, during or after said step of vapor deposition a metallic sheet or web as a substrate for the vapor deposition of scintillators or phosphors is highly desired.

Not only for that reason a metallic substrate is desired, but the more for applicability (read-out) in a flat scanning apparatus in view of the stringent requirements set forth hereinbefore, as an aluminum plate shows an intrinsic tendency to curl as a function of external forces or influences. Moreover an alternative is recommended for a configuration as disclosed in EP-A 1 398 662, wherein an X-ray cassette for computed radiography is provided in a form of a hollow box comprising top and bottom, wherein said bottom side and front, rear and lateral sides thereof have a higher material stiffness than the top side and wherein said top side is a deformable carrier or support material, supporting a storage or stimulable phosphor sheet layer.

Although providing a suitable deformability, a degree of flatness as desired in applications such as computed radiography, direct radiography and classical screen/film applications mentioned before remains questionable for metallic webs or sheets, as rigidity of said plates lays burden on its suitability for use in a read-out apparatus.

OBJECTS AND SUMMARY OF THE INVENTION

Therefore it is an object of the present invention to provide a flexible sheet, web or panel, reversibly deformable before, during and after coating a scintillator or phosphor layer thereupon, wherein said sheet, web or panel has desired mechanical properties such as stiffness and elasticity.

It is another object of the present invention to provide an improved manutention for scintillator or phosphor screens, sheet or panels.

It is still another object of the present invention to provide scintillator or phosphor screens, sheets or panels that can again be made flat after bending during vapor deposition.

Still a further object is to provide methods or techniques in order to reach the objects as set forth above.

The above-mentioned advantageous effects have been advantageously realized by providing a sheet, web or panel having the specific features, given in claim 1 and particular manufacturing methods having the specific features set out furtheron. Specific features for preferred embodiments of the invention are set out in the dependent claims and in the drawings.

Further advantages and embodiments of the present invention will become apparent from the following description and drawings.

Other object will become apparent from the description hereinafter and from the claims.

BRIEF DESCRIPTION OF THE DRAWINGS

Following Figures represent an illustration of different embodiments of configurations related with the coated and flattened substrate. It is clear that these Figures, showing preferred embodiments of the modified substrate sheet or web, according to the present invention, are in no way limited thereto.

DETAILED DESCRIPTION OF THE INVENTION

Figure 1:
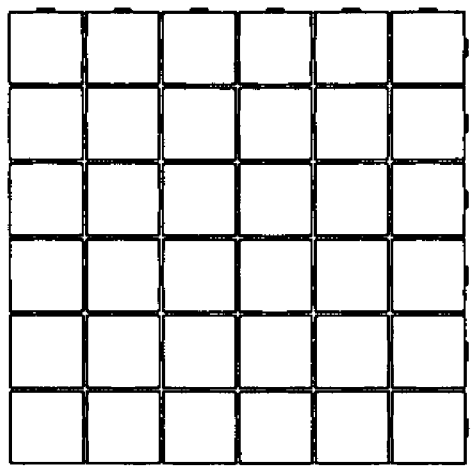
FIG. 1 shows a substrate area divided in square regions, separated from "rows" or "grooves".
Figure 2:
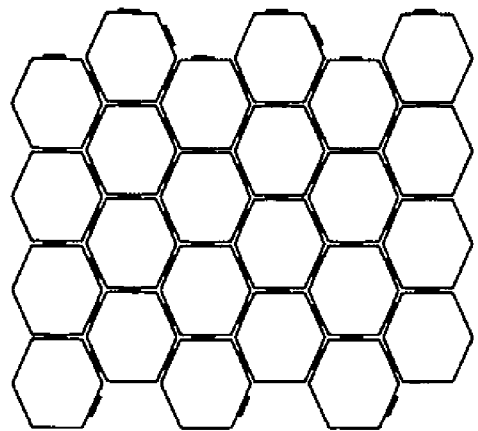
FIG. 2 shows a substrate area divided in hexagonal regions, thus forming a honeycomb structure.

According to the present invention a phosphor or scintillator sheet, web or panel is provided, wherein a phosphor or a scintillator layer is coated onto a flexible-made substrate, the stiffness of which is lowered by presence of pits or grooves onto said substrate. Substrates made flexible for the purpose of the present invention are e.g., but not limited to, polymer material, glass, ceramics and metals. So glass plates such as quartz, boron silicate glass, chemically tempered glass and crystallized glass; ceramics such as alumina and silicon nitride; plastic films such as cellulose acetate film, polyester film, polyethylene terephthalate film, polyethersulfone film, poly(sulfonic acid) film, polyallyrate film, poly(ether ether ketone) film, polyamide film, polyimide film, cellulose triacetate film, and polycarbonate film; a sheet of metal such as aluminum, iron, copper and chromium; and metal sheets. Methods according to the present invention, in order to prepare said sheet, web or panel (and thus to apply those pits or grooves), are techniques selected from the group consisting of mechanical, chemical, (laser) optical, photo-etching and electrical etching techniques. Grooves are applied in a continuous or discontinuous mode (e.g. with interruptions). Patterns in form of in square, rectangular, hexagonal (honeycomb-like), circular, ellipsoidal and deformed regions derived therefrom, separated from "rows" or "grooves" are thus provided, these forms being non-limitative. Pits are preferably in same forms.

As said phosphor or scintillator layer is applied by vapor deposition techniques at high temperatures (up to about 800° C.), it is clear that the substrate or substrate support must be heat-resistant, so that plastic materials as polyethylene terephthalate are not preferred as being deformed (and even melted) through heating. Apart from low air and moisture permeation properties heat-resistant properties reduces the choice of a suitable support or substrate. According to the present invention a sheet, web or panel is provided, wherein said flexible-made support or substrate is selected from the group consisting of metal sheets, plastic sheets, reinforced resin sheets, inorganic glass and ceramic sheets. So according to the present invention besides selected types of inorganic glass—such as aluminosilicate glass—, ceramics as ceramic supports, reinforced resins as e.g. carbon fiber reinforced resin, metal sheets, and more particularly, aluminum sheets—in view of its light weight and reflection properties—are highly desired. As already suggested hereinbefore too rigid aluminum supports (e.g. those having a thickness in the range from 500–1000 μm and an elasticity modulus of more than $1 \times 10^4$) should be made less rigid. Therefor it is recommended to have knowledge of the E-modulus (measured as defined in DIN53457) of a series of supports, in order to know, which should be treated and made more flexible.

TABLE 1

| Polymer | E-modulus in N/mm$^2$ measured following DIN53457 |
|---------|---------------------------------------------------|
| PVC     | 3000                                              |
| PE-HD   | 800                                               |
| PP      | 1400                                              |
| PS      | 1850                                              |
| PA      | 3000                                              |
| POM     | 3100                                              |
| PMMA    | 3300                                              |
| PEEK    | 3650                                              |

TABLE 1-continued

| Polymer | E-modulus in N/mm$^2$ measured following DIN53457 |
|---|---|
| PC | 2500 |
| PI | 4000 |

As is clear from the Table 1 for polymers, an elasticity modulus E in the range above 1000 N/mm$^2$, measured as described in DIN 53457, advantageously require a further treatment in order to provide flexibility as desired. According to the present invention a sheet, web or panel as envisaged, comprises a phosphor or scintillator layer coated on a flexible-made support or substrate, wherein said support is made flexible up to an elasticity modulus E of less than 1000 N/mm$^2$, measured as described in DIN 53457.

One way to realize this e.g. for metal supports as an aluminum support is to make the aluminum support thinner (e.g. in the range from 100–600 μm, instead of e.g. 1000 μm).

On the aluminum substrate can, in principle, be placed a light reflecting layer such as a layer containing a titanium dioxide or a light absorbing layer such as a layer containing carbon black.

Pretreatments in order to remove greasy substances from the surface of the aluminum foil are highly recommended. Therefore the aluminum foil may be subjected to a degreasing treatment with a surfactant and/or an aqueous alkaline solution to thereby remove dust, rust and other impurities on the surface thereof.

Degreasing can be performed by a 2-step treatment either treating the aluminum foil with an alkaline solution followed by a desmutting in an acidic solution or degreasing in an acidic solution followed by an alkaline desmutting. Acidic solutions preferably contain chromic acid, phosphoric acid or sulphuric acid, and usable alkaline solutions may contain NaOH, KOH, etc.

Typical aluminum supports for use in accordance with the present invention are made of pure aluminum or of an aluminum alloy, the aluminum content of which is at least 95%. According to the present invention a sheet, web or panel is provided, wherein said flexible-made support or substrate is anodized aluminum.

In a preferred embodiment according to the present invention said anodized aluminum support has a thickness of up to at most 1000 μm (more preferably less than 600 μm and still more preferably in the range from 100 μm up to 450 μm).

In order to prepare anodized aluminum an electric current is passed through the grained aluminum foil immersed as an anode in a solution containing sulfuric acid, phosphoric acid, oxalic acid, chromic acid or organic acids such as sulfamic, benzene sulfonic acid, or mixtures thereof. An electrolyte concentration from 1 to 70% by weight can be used at a temperature in the range from 0–70° C., and more preferably at a temperature in the range from 35–60° C. The anodic current density may vary from 1–50 A/dm and the voltage within the range 1–100 V to obtain an anodized film weight of 1–8 g/m $Al_2O_3.H_2O$. The anodized aluminum foil may subsequently be rinsed with demineralized water at a temperature in the range of 10–80° C. After the anodizing step a posttreatment e.g. sealing may be applied to the anodic surface. Sealing of the pores of the aluminum oxide layer formed by anodization is a technique known to those skilled in the art of aluminum anodization. This technique has been described in e.g. the "Belgisch-Nederlands tijdschrift voor Oppervlaktetechnieken van materialen" (Journey for Surface Techniques and Materials), Volume 24, January 1980, under the title "Sealing-kwaliteit en sealing-controle van geanodiseerd Aluminum" (sealing quality and sealing controll of anodised aliminum). Different types of sealing of the porous anodized aluminum surface exist. Preferably, said posttreatment is performed by treating a grained and anodized aluminum support with an aqueous solution containing a bicarbonate as disclosed in EP-A 0 567 178.

A preferred roughness of an anodised aluminum foil, sheet, plate or panel is preferably so that an average center line surface roughness (Ra) of the surface is in the range from 0.3 to 1.3 μm, but it is clear that etching procedures as strived at in the context of the present invention provoke much more drastic changes in the surface structure or texture (e.g. in the range from 10 μm to 100 μm and even more preferred from 1 to 10 μm). So according to the present invention roughness of said anodized aluminum is so that an average center line surface roughness (Ra) is in the range from 1 to 10 μm. Such intervening drastic changes are applied at one or both sides of the support. In a preferred embodiment it is applied at one side of the support sheet material, and in a most preferred embodiment, it is applied at the side at which the phosphor is evaporated. In other cases however the surface structure of the back side is changed by said etching procedures. According to the present invention said roughness is thus applied on at least one side of said sheet, web or panel.

More detailed descriptions with respect to etching procedures are given hereinafter now, According to the present invention roughening of an aluminum foil is, in another embodiment, performed according to the methods well known in the prior art. So the surface of the aluminum substrate can be roughened (etched) in a structured or textured way either by mechanical, chemical, optical or electrochemical graining or by a combination thereof. Mechanical graining can be performed by e.g. sand blasting, ball graining, wire graining, brush graining, slurry graining or a combination of these. Mechanical etching procedures thus refer to indentation procedures, wherein grooves are cut into the metal web, sheet, or foil. More preferably said grooves are cut in one direction so that said grooves are arranged parallel to each other. In a preferred embodiment those grooves are at a constant depth into the aluminum and at a constant distance from one another, moreover perpendicular to the longest sides of the metal sheet, foil or web. As it is envisaged to provide flexible supports for all coated formats, the format is determining at what a distance grooves should be cut or etched (as further explained hereinafter). An etching resolution for relief patterns between the grooves or pits, thus formed, is normally in the range of some micrometers. Grooves may also be cut in more than one direction in order to get a two-dimensional pattern onto the aluminum foil: squares, rectangles and parallellograms may thus be formed, offering a textured pattern and allowing arrangement of structured screens or panels by coating with scintillators or phosphors. In case wherein grooves are only cut into one parallel direction, the substrate support will clearly be weakened in that direction, but in a direction perpendicular thereupon, the support will still be rigid! In another embodiment mechanical roughening (etching) of the surface substrate comprising aluminum can be carried out by wet brushing as in U.S. Pat. Nos. 5,775,977 and 5,860,184, wherein use is made of a cylinder brush in which brush rows having bundles of organic fibers and metal wires are arranged side by side on the surface and wherein the suspension used for the wet brushing contains abrasive particles in water. Alternatively, as disclosed in U.S. Pat. No. 6,273,784, there is provided at least one of a moving device for moving a graining brush in the width direction of aluminum web and a turning device for turning the graining brush so that the graining brush can be placed obliquely against a transporting direction of the aluminum web. By moving the graining brush periodically in the width direction of the aluminum web, the entire graining brush uniformly comes into contact with the aluminum web. By turning the graining brush to place it obliquely against the transporting direction of the aluminum web, the entire graining brush can always come into contact with the aluminum web. Accordingly, the abrasion in the bristles of the graining brush is maintained uniform.

Chemical graining can be done e.g. by alkaline etching with a saturated aqueous solution of an aluminum salt of a mineral acid. Chemical etching may proceed as described in DE-A-2251382 wherein a process for etching an aluminum foil has been described consisting of an alkaline etching by means of a 10% aqueous sodium hydroxyde solution followed by an acidic etching by means of a 20% nitric acid solution. Otherwise the method described in EP-A 0 709 232 may be applied, said method comprising the steps of roughening an aluminum foil and subsequently anodizing said aluminum foil characterized in that after the roughening and before the anodization said aluminum foil is etched with an alkaline solution comprising strong alkali and subsequently with an acidic solution comprising strong acid. Although the alkaline etching may be quite agressive it may advantageously be applied in combination with the previously mentioned mechanical etching technique or with the techniques mentioned hereinafter. Suitable alkali for use in aqueous etch solutions are inorganic strong alkali, strong alkali being alkali with a pKa of at least 13. Examples of particularity suitable alkali are e.g. NaOH, KOH or mixtures thereof. Salts of a strong alkali and a weak acids may also be used in admixture with strong alkali as e.g. sodium gluconate. The total amount of alkali in this aqueous etch solution preferably ranges from 4 g/l to 50 g/l. Chemical etching times with the mentioned alkaline solutions are preferable in the range of a few seconds up to several minutes, and more preferably between 2–5 s and 4–5 min. Suitable acids for use in the aqueous acidic etch solution are preferably strong inorganic acids, strong acids being acids with a pKa of at most 1. Examples of acids that are particularly suitable are e.g. $H_2SO_4$, HCl, $HNO_3$, HF, $H_3PO_4$ or mixtures thereof. Weak acids may also be used in admixture with strong acids. The total amount of acid in the aqueous acidic etch solution is preferably at least 200 g/l and more preferably at least 250 g/l. Chemical etching times are preferable in the range of a few seconds up to several minutes, and more preferably between 2–5 s and 4–5 min. Between etching with an alkaline solution and etching with an acidic solution the aluminum foil is advantageously rinsed with demineralized water.

Photo-etching is a further well-known and useful technique within the scope of the present invention, in that it is obtained by depositing a photoresist pattern on a metal base and then etching away the parts, not covered by the photoresist pattern, with the aid of an chemical etchant. When applying this technique, the "etching factor" is defined as the ratio between the final etching depth and the length of lateral etching under a photoresist pattern and is, in general equal to 1.5, i.e. an etching of approximately 10 micrometres also occurs in the lateral direction for an etching of 15 μm in the depth direction. Double-sided etching of support substrates may advantageously be such that two patterns are obtained by etching, each of the patterns extending from one side of the material over a part of the thickness of the support material. Organic additives which are normally used in electrolytic baths have the property that they influence the etching rate and may be useful therefor. A number of suitable additives of this type is mentioned in the book entitled "Modern Electroplating", 3rd edition, 1973, published by John Wiley & Son Incorporated, pages 296 et seq.

Electrochemical graining is an advantageously used technique because it provides a uniform surface roughness over a large surface area with a very fine and even grain which is commonly desired. In order to obtain a finely grained surface topography the concentration and temperature of the electrolytic solution, the current form and density should be optimized. Electrochemical graining is preferably conducted in a hydrochloric and/or nitric acid containing electrolyte solution using an alternating or a direct current. Other aqueous solutions that can be used in the electrochemical graining are e.g. acids like $HNO_3$, $H_2SO_4$, $H_3PO_4$, optionally containing, in addition, one or more corrosion inhibitors such as $Al(NO_3)_3$ $AlCl_3$, boric acid, chromic acid, sulfates, chlorides, nitrates, monoamines, diamines, aldehydes, phosphates and $H_2O_2$, without being limitative.

Mechanical and electrochemical methods may be combined as disclosed in U.S. Pat. Nos. 4,476,006; 4,477,317; 4,576,686; 5,045,157; 5,174,869; 5,213,666. An example of a combination of mechanical and electrochemical etching procedures has e.g. been described in U.S. Pat. No. 4,477, 317. Therein a sheet, foil or strip material comprising aluminum is first mechanically and then electrochemically roughened on one or both surfaces in order to produce a basic structure, in which the arithmetic mean of the distribution of diameters of the pits is in the range from about 1 to 5 μm.

Electrical etching can be applied by "spark erosion" procedures wherein "arc-grained" surfaces are produced (as has e.g. been described in U.S. Pat. No. 5,462,609. Substantial surface areas can be treated by continuously magnetically moving an electric arc around a general loop direction such as a circle, ellipse or oval and moving the surface. The arc may treat a substantial surface area and the arc treatment can be used to clean or increase surface area, or both, and a reactant or treatment agent can be brought to the arc contact site to alter the surface treated with the arc as has been described in U.S. Pat. No. 5,481,084. Auxiliary treatments for the surface can precede or follow the arc treatment, or both. Surface properties including a mild roughness or matte condition suitable even for critical applications can be thus be attained in tailor-made form. So produced arc-grained microstructure patterns may be applied to large sufaces up to several square meters. Normally such microstructures are much coarser than those obtained by an electrochemical etching procedure.

Combinations of different etching techniques may advantageously been used as has e.g. been described in U.S. Pat. No. 5,755,949 wherein plate-, foil- or web-shaped workpiece of aluminum is subjected, in an electrolyte bath, to an alternating current and wherein, prior to the electrochemical graining, the workpiece is mechanically grained. After the graining steps, an etching treatment as well as an anodical oxidation and, thereafter, a hydrophilization are performed.

Pits in (hexagonal) form of honeycombs or honeycomb-like structures can be obtained on a corrugated surface processed by roughening described in U.S. Pat. No. 5,837, 345, wherein the corrugation on the support surface comprises big corrugation having an average pitch of from not less than 5 µm up to not more than 30 µm, and middle corrugation superimposed on the big corrugation, wherein the middle corrugation comprising honeycomb pits having an average diameter of from not less than 0.5 µm up to not more than 3.0 µm.

Optical etching methods and, more particularly, laser etching, laser gravure or laser-cutting techniques known from radar-related technologies, allowing etching from a parabolic configuration, of large surfaces up to several square meters, are most advantageously performed in order to provoke regularly distributed pits over the anodized aluminum surface, having an average diameter of about 100 µm and less, and wherein laser "etching" proceeds up to a depth of about 0.01 up to 0.1 mm.

In another embodiment as in U.S. Pat. No. 4,619,894 a process for forming a selected pattern on the surface of a substrate may be applied, comprising the steps of forming on said substrate a substantially etchable, low ohmic resistivity cermet layer of aluminum and $Al_2O_3$ by depositing aluminum on said substrate in an oxygen environment; heating selected regions of said cermet layer by exposing such selected regions to radiant energy to selectively transform said exposed regions from said substantially etchable low ohmic resistivity material to substantially less-etchable material higher ohmic resistivity; and removing the unexposed regions to form a pattern of less etchable higher ohmic resistivity material on said substrate surface.

Furtheron as in U.S. Pat. No. 4,976,809 a thin film of aluminum or aluminum alloy may be scanned with a laser beam sufficient to melt the film and cause it to planarize, so that an oriented crystal structure is formed with grain boundaries being aligned orthogonally to the rows and column of the hole pattern. In the application described in that patent, a photoresist mask is then aligned with the resultant crystal structure in a manner such that boundaries extend substantially only in a direction across the width of the desired conductor lines and the aluminum which is present in the crystal structure outside the desired conductor line is then removed by plasma etching through the mask.

As in U.S. Pat. No. 5,514,618 a direct laser ablation process is advantageously applied: patterning is done either by utilizing deposition, direct ablation of an etch block followed by etching, or deposition followed by direct laser ablation. In the preferred embodiment, aluminum channels are made by deposition followed by a direct laser ablation. Illustrated therein is a direct laser etch: an aluminum layer, optionally covered with an etch block, is directly ablated with laser energy and thereafter wet or dry etched.

In another embodiment as disclosed in U.S. Pat. No. 6,522,014 laser drilling is accomplished using a laser radiation having a wavelength between about 180 nanometers and about 600 nanometers. Depressions may have any cross-sectional shape and any spatial distribution of depths, wherein any cross-sectional shape, such as circular or non-circular, a rectangular channel, or a combination thereof can be attained, without however being limitative. An apparatus and process for the production of fine line metal traces has been disclosed in U.S. Pat. No. 5,364,493.

An optical machining apparatus for irradiating light from a light source onto a source to be machined to form a grooves in the surface as described in U.S. Pat. No. 5,223,693 may be used.

As disclosed in U.S. Pat. No. 5,702,662 an apparatus and process for ablating a matrix of high density vias in a flexible substrate may be used and applied. Therein an apparatus is cantilevered on a horizontal shelf from a partition where it can be rigidly supported. A vacuum container reciprocates towards and away from the partition and supports the horizontal shelf by permitting supporting casters to bear on and be supported by the reciprocating container. When the container is away from the partition, servicing of the apparatus as well as the insertion and removal of substrate can occur. When the container is adjoined to the partition, a vacuum can be drawn on the apparatus and processing commenced. A continuous flexible substrate is provided extending in a circuitous path between a supply roll and a take up roll, all interior of the container. The flexible substrate is maintained under constant tension and incrementally advanced. The substrate is incrementally advanced and stopped, passing across a table. When the roll is advanced, the table releases the substrate and is cleaned of the debris resulting form previous ablations. When the roll is stopped, the table clamps and precisely levels the substrate for sequential ablation of the substrate. In the same U.S. Pat. No. 5,702,662 document it is told that it is desirable to process the substrate in a vacuum, more particularly when organic products are present, so that oxidation thereof occurs with generation of hydrocarbons: where a vacuum is not utilized, hydrocarbons occurring in the form of soot are accumulated, and the soot does not travel far and lands on the substrate. This can cause the material being processed to be out of registration and further, as the material is incrementally advanced, it gets scratched. It is further advantageous that a laser beam generated outside of the vacuum is scanned inside the vacuum so that artifacts are not repeatably generated on produced product. Side-by-side beams, when both operational, moreover increase throughput: when only one beam is operational, total loss of production capacity of the machine does not occur, as it runs at roughly half speed. Provision can be made for operation of the disclosed apparatus with one laser. Last but not least, heating in the vicinity of the ablated substrate cannot be tolerated. As the ablative process generates heat, heating causes distortion of the substrate, thus distorting the regular ablated matrix to be achieved. Further, the distorted laminate can move from its position of precise support on the table.

Finally, and since the entire apparatus and process must be carried out internally of a vacuum, provision must be made for the convenient support of the apparatus within a vacuum container. At the same time, access for servicing of the equipment and suitable adjustment of the optics is required. Further developments related therewith as described in U.S. Pat. No. 5,481,407 may also be applied.

In a preferred embodiment an aluminum sheet is kept distortion-free on a mounted surface such as on a cylindrical drum: laser ablation or laser gravure techniques are most advantageously applied in that way order to get a more flexible aluminum sheet or web.

In another preferred embodiment said aluminum sheet is a web that is continuously fed and kept, at least in part, distortion-free on part of a cylindrical drum, where it is laser ablated or graved in order to become more flexible and further rolled-up on another drum.

Coating a phosphor or scintillator layer on such a more flexible substrate is preferably applied on-line in vacuum, wherein the vapor deposition process further performed, has in detail been disclosed in EP-Applicatons Nos. 3 100 723, filed Mar. 20, 2003 and 04 101 138, filed Mar. 19, 2004. According to the configurations shown in that application all possibilities are offered in order to make the aluminum substrate more flexible at one side (the phosphor layer side or the back side) or at both sides by means as disclosed before. Plate segments providing an improved manutention thus provide a much more flat configuration to become available, in that a tendency to curl becomes reduced.

The deformable aluminum substrate is thus contemplated to be used for further deposition of scintillator or phosphor layers. Apart from aluminum pure copper is recommended as raw base or support material because of its good heat conduction: its ability to conduct heat and to suppress thermal strain is highly appreciated as well as its workability in that etchability and application of gravure techniques thereto can be performed with high accuracy thereto. When aluminum is most preferred, this is due to its lightweight properties and low absorption of high energy radiation as from X-rays.

As already told in EP-Applicatons Nos. 3 100 723, filed Mar. 20, 2003, and 4 101 138, filed Mar. 19, 2004, the possibility to deform the flexible substrate creates the opportunity to coat large surface areas of such a flexible substrate with the vapor deposited scintillator or phosphor. Envisaged by the present invention is, in the first place, to make the coated flexible surface available in a read-out apparatus with an improved manutention, without cracking the phosphor or scintillator layer. According to the coating process of that invention, at the moment of deposition, said phosphor or scintillator layer is a binderless layer, wherein it has been told that it is not excluded to make use of polymers, showing ability to become vaporized, in order to serve as binder material e.g. between substrate and phosphor or scintillator layer or even between the preferred phosphor or scintillator needles in the coated layer in order to give the layers structural coherence. Moreover when laminating a polymer layer onto the deposited layer, it is not excluded that polymer material is filling, at least in part, the voids between those needles.

With respect to the specific application, related with CR and DR, it is clear that in view of image quality, and more particularly in view of sharpness, binderless phosphor or scintillator layers are preferred. With respect thereto it is clear that vaporization of raw materials in order to build the desired scintillators phosphors is a preferred technique, provided that, according to the present invention the layers have been deposited on a flexible substrate, deformed at least before, during or after said step of vapor deposition, by being mounted onto a roller or by being guided over one or more roller(s), as claimed, and wherein it is envisaged to deform the flexible support in order to get a flat sheet or panel, ready-for-use, suited for specific CR and DR applications as set forth.

In one embodiment according to the present invention said phosphor is a prompt emitting luminescent phosphor. Said luminescent phosphor is suitable for use e.g. in intensifying screens as used in screen/film radiography.

In another embodiment according to the present invention said phosphor is an alkali halide phosphor having phosphor crystals without binder, in form of piles, pillars, pillar-shaped blocks, prisms, needles or tiles. A binderless screen thus formed with said alkali halide phosphor provides an increased image quality for such a flexible screen. Just as in U.S. Pat. No. 4,769,549 the image quality of a binderless phosphor screen is improved as the phosphor layer has a block structure, shaped in fine pillars, and as described in U.S. Pat. No. 5,055,681 wherein a storage phosphor screen comprising an alkali halide phosphor in a pile-like structure is disclosed.

Preferred phosphors of the alkali metal storage type to be deposited from the vapor phase, as in the screens or panels according to the present invention are those e.g. that have been described in U.S. Pat. No. 5,736,069.

That phosphor has been disclosed as having the general formula given hereinafter:

$$M^{1+}X \cdot aM^{2+}X'_2 \cdot bM^{3+}X''_3 : cZ$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" may be the same or different and each represents a halogen atom selected from the group consisting of F, Br, Cl, and I, and $0 \leq a \leq 1$, $0 \leq b \leq 1$ and $0 \leq c \leq 0.2$.

Besides screens or panels the phosphor or scintillator layers of which have a composition as disclosed hereinbefore a phosphor screen or panel containing a CsX:Eu stimulable phosphor, wherein X represents a halide selected from the group consisting of Br and Cl is highly desired.

The preferably selected phosphor, described in EP-A 1 113 458 in a phosphor panel provided with a selected vapor deposited binderless phosphor layer, however is CsBr:Eu in its most elementary form. According to the present invention said screen, sheet or panel has a a needle-shaped CsBr:Eu phosphor. Said binderless phosphor is present in a crystal from in a "fine needle" configuration in favor of an optimized image quality. The preparation method of such phosphors has been described in PCT-filing WO 01/03156, wherein raw materials have been described as been deposited by physical vapor deposition techniques as thermal vapor deposition, sputtering and electron beam deposition. Therefore a mixture of CsBr and EuOBr and/or EuBr$_3$ is provided as a raw material mixture in the crucibles, wherein a ratio between both raw materials normally is about 90% by weight of the cheap CsBr and 10% of the expensive EuOBr and EuBr$_3$, expressed as wt %. It has however been shown that as a function of coating (evaporating) temperature ratios can be adapted in favor of lower material and production cost, without resulting in changes in composition: so higher vaporization temperatures for the raw material mixture in ratio amounts of 99.5 wt % CsBr and 0.5 wt % EuOBr/EuBr$_3$ provide the same result (related with speed) as before. Such a process obviously leads to a more homogeneously divided phosphor layer and a lower amount of Eu-dopant. Screens of CsBr: Eu phosphors having lower amounts of Europium dopant, i.a. in the range from 100–200 p.p.m. versus at least 500–800 p.p.m. (see Examples in EP-A 1 113 458—in the absence of particularly designed crucibles allowing more uniform heating as described in the patent application filed simultaneously with the present application), have thus become available. These data are suggesting that the presence of lower amounts of Europium dopant, nevertheless leading to the same screen speed, is indicative for a more homogeneous distribution and/or more efficient built-in of the dopant. Opposite thereto screens requiring an amount of dopant in the range from 1000 p.p.m., and even up to 3000 p.p.m., are indicating that dopants do not seem to have been built in efficiently.

After vapor deposition whereby the phosphor layer on the flexible substrate is performed, the thus coated layer is advantageously subjected to a heat treatment, also called "annealing", as described e.g. in EP-A 1 217 633.

The high degree of crystallinity is easily analysed by X-ray diffraction techniques, providing a particular XRDspectrum as has been illustrated in EP-A 1 113 458 and as has been confirmed in US-Application 2003/0075689.

The preferred CsBr:$Eu^{2+}$ phosphor contains an europium activator, wherein the europium compound of the evaporation source preferably comprises europium in divalent form (as $Eu^{2+}$) as much as possible (i.a. at least 70% and more preferably much more) and in trivalent form (as $Eu^{3+}$) as inherently being unavoidable. The stimulable phosphor may contain a metal oxide such as aluminum oxide, silicon dioxide, and/or zirconium oxide in an amount of 0.5 mol or less per one mole of cesium. Moreover minor amounts of alkali metals other than Cs (Li, Na, K, Rb) and each of alkaline earth metals (Mg, Ca, Sr, Ba) have been shown to be present in the CsBr:Eu matrix in amounts of less than 10 ppm and less than 2 ppm, respectively, and each of rare earth elements other than Eu and each is of other elements were present in same CsBr:Eu matrix in amounts of less than 20 ppm and less than 10 ppm, respectively. Said preferred CsBr:$Eu^{2+}$ phosphor, obtained after vapor deposition as a needle-shaped phosphor, is characterized by voids between the needles. In order to fill those voids, measures can be taken as described in EP-A 1 347 460, wherein voids are partially filled with a polymeric compound; as in EP-A 1 349 177, wherein vapor deposited pigments like the preferred β-Cu-phthalocyanine nanocrystalline dye compound are filling said voids or as in EP-Application No. 03 100 471, filed Feb. 26, 2003, wherein the voids are at least partially filled with polymeric compounds selected from the group consisting of silazane and siloxazane type polymeric compounds, mixtures thereof and mixtures of said silazane or siloxazane type polymeric compounds with compatible polymeric compounds. More particularly with respect to the said dyes or pigments, vapor deposition thereof can be performed in the vacuum deposition chamber used in the configuration of the production method in order to prepare the phosphor or scintillator layers by evaporation in vacuum as described in WO 01/03156 or in EP-Applications Nos. 03 100 723, filed Mar. 20, 2003 and 04 101 138, filed Mar. 19, 2004.

Apart from the vapor deposition of scintillator or phosphor materials, it is highly recommended to provide or coat the thus structured or textured substrates or supports with scintillators or phosphors in powdery form and to provide powdery phosphors or scintillators together with minor amounts of binder materials (in favor of sharpness) to the aluminum supports. Pits and/or grooves, depending on the texture or structure applied to the substrate support, are thus filled with scintillator or phosphor material in powdered form, accompanied by binder one or more binders to give the layers structural coherence. In general, the binders useful in this invention are those conventionally used for this purpose in the art. They can be chosen from a wide variety of known organic polymers that are transparent to X-radiation, stimulating and emitted radiation. Binder materials commonly used for this purpose include, but are not limited to, natural polymers such as proteins (for example gelatins), polysaccharides (such as dextrans), poly(vinyl acetate), ethyl cellulose, vinylidene chloride polymers, cellulose acetate butyrate, polyvinyl alcohol, sodium o-sulfobenzaldehyde acetal of poly(vinyl alcohol), chlorosulfonated poly (ethylene), a mixture of macromolecular bisphenol poly (carbonates), and copolymers comprising bisphenol carbonates and poly(alkylene oxides), aqueous ethanol soluble nylons, poly(alkyl acrylates and methacrylates) and copolymers of poly(alkyl acrylates and methacrylates and acrylic acid or methacrylic acid) and poly(vinyl butryal) and poly(urethanes) elastomers. More classical or conventional coating techniques using conventional solvents and dispersing techniques than the above mentioned vapor deposition techniques can be applied, such as roller coating, gravure coating, screen printing. Generally, a phosphor powder and other addenda are mixed into a solution of a binder material and a suitable solvent (such as alcohols, chlorinated hydrocarbons, ketones and esters of lower alcohols) and coated using any suitable means including blade and knife coating onto the support After having deposited the scintillator or phosphor layer onto the flexible substrate support according to the present invention, a protective coating onto said phosphor or scintillator layer is advantageously applied. Preferably, said protective coating is coated or laminated onto said phosphor or scintillator layer. Most preferably said protective coating is organic resin layer. More in particular, said protective layer is provided in order to protect the coated scintillator or phosphor against moisture.

According to the present invention a sheet, web or panel is provided, wherein a layer of "parylene" is in contact with the said phosphor or scintillator layer, at one or both sides thereof.

Such a protective coating composition is not restricted to one is layer, but may comprise more than one layer as has e.g. been described in EP-A 1 286 363, wherein said protective layer is divided in at least two layers, being a layer A, closest to said phosphor layer and a layer B, farther away from said phosphor layer; characterized in that said layer A has a lower water vapor permeability coefficient than said layer B. Just as in EP-A 1 286 364, said layer A preferably is a layer of parylene, and more preferably said parylene is selected from the group consisting of parylene C, parylene D and parylene HT. It is not excluded to have such a parylene layer coated onto said flexible substrate as in EP-A 1 376 615, wherein a moisture repellent layer is present inbetween the substrate and the phosphor layer. It is moreover not excluded to have a film-forming silazane or siloxazane type polymeric compound, covering the outermost surface of the poly-paraxylylene film on the phosphor side as has been disclosed in EP-Application No. 03 100 472, filed Feb. 26, 2003.

In a particular embodiment said vapor deposited protective composition is applied in the same sealed zone in the same coating apparatus wherein the phosphor or scintillator layer has been deposited as described in EP-Applicatons Nos. 3 100 723, filed Mar. 20, 2003 and 4 101 138, filed Mar. 19, 2004. Such a protective composition and/or laminate is advantageously applied to the preferred CsBr:$Eu^{2+}$ storage phosphor, which is known to be moisture sensitive. Other hygroscopic phosphors that are advantageously protected in the same way are e.g. BaFCl:Eu, BaFBr:Eu, GdOBr:Tm, LnTaO$_4$:(Nb,Gd), Ln$_2$SiO$_5$:Ce, LnOX:Tm (where Ln is a rare earth element), Gd$_2$O$_2$S:Tb, Gd$_2$O$_2$S:Pr, Ce, ZnWO$_4$, LuAlO$_3$:Ce, Gd$_3$Ga$_5$O$_{12}$:Cr, Ce and HfO$_2$ used in intensifying screens; CsI:Na applied in scintillator panels and storage phosphors suitable for use in computed radiography (CR) as e.g. BaFBr:Eu, BaFI:Eu, (Ba,Sr)F(Br,I):Eu, RbBr: Tl, CsBr:Eu (as most desired), CsCl:Eu and RbBr:Eu; or CsI:Tl, which is, just as the Eu-doped Lu$_2$O$_2$S scintillator in EP-Application No. 03 101 947, filed Jun. 30, 2003, particularly suitable for use in DR-cassettes.

Applying a protective coating or laminate onto said phosphor or scintillator layer is advantageously performed, wherein said protective coating is an organic resin layer or wherein said protective coating is an inorganic layer. According to the present invention a layer of "parylene", already mentioned hereinbefore, is particularly recommended as a layer in contact with the phosphor or scintillator layer at one or both sides thereof, thus protecting said layer at least against moisture: details about the composition of such a layer can be found in EP-A's 1 286 362, 1 286 363, 1 286 364 and 1 286 365. A cross-linked polymeric layer is thus formed on a phosphor screen material, wherein the said polymeric material layer has been formed by reaction of at least one component, thereby forming self-condensing polymers. Reactive monomers are provided in form of heated vapor in order to form the desired condensation polymer in form of a p-xylylene or "parylene" layer. Examples of these "parylene" layers are poly-p-xylylene (Parylene-N), poly-monochloro-p-xylylene (Parylene-C) and polydichloro-p-xylylene (Parylene-D). If desired a pigment can be integrated into a thin film of a poly-p-xylylene as has been described in JP-A 62-135520. After having coated such a protective layer a laminating (polymer) layer is advantageously applied, more particular with respect to protection of the phosphor or scintillator layer against abrasion in working conditions as e.g. in a scanner apparatus. So in addition to a "parylene film" as a protective layer, a laminating polymer layer (e.g. PET—polyethylene therephthalate—or PEN—polyethylene naphthalate) is advantageously provided thereupon as an additional protective organic resin, whether used as a temporarily or permanent rigid (laminate) layer, wherein care is taken that the flexibility obtained by the specific measures of the present invention are not annulated, with respect to manutention in read-out scanning apparatus.

According to the present invention a protective outermost coating is further provided (in addition to the moisture-preventing is parylene layer), farther from the support than the phosphor layer. Additives dispersed in such a (more classical) protective coating include light-scattering fine particles (e.g., particles of magnesium oxide, zinc oxide, titanium dioxide and alumina), a slipping agent (e.g., powders of perfluoro-olefin resin and silicone resin) and a cross-linking agent (e.g., polyisocyanate). Stabilizers, like organic compounds or an oligomeric or polymeric compound as described in EP-A 0 747 908 are very useful besides reducing agents (such as oxysulfur reducing agents), phosphites and organotin compounds, in order to prevent yellowing. The thickness of the protective film generally is in the range of about 0.1 to 20 µm, if the film is made of polymer material. For enhancing the resistance to stain, a fluororesin layer is preferably provided on the protective film. The fluoro-resin layer can be formed by coating the surface of the protective film with a solution in which a fluororesin is dissolved or dispersed in an organic solvent, folowed by drying the coated dispersion. The fluoro-resin may be used singly, but a mixture of the fluoro-resin and a film-forming resin can be employed. In the mixture, an oligomer having a polysiloxane or a polysiloxazane structure or perfluoro-alkyl group can be further added. In the fluororesin layer, fine particle filler may be incorporated to reduce blotches caused by interference and to improve the quality of the resultant image. The thickness of the fluoro-resin layer is generally in the range of 0.5 to 20 µm. For forming the fluoro-resin layer, additives such as a cross-linking agent (advantageously used in order to improve durability of the fluororesin layer), a film-hardening agent and an anti-yellowing agent may be used.

In order to improve sharpness of the resultant image, at least one of the coated layers may be colored with a colorant which does not absorb the stimulated emission but the stimulating rays in case of storage phosphor panels. Solid colorant particles required therefor are subjected to repeated collisions with the milling media, resulting in crystal fracture, deagglomeration, and consequent particle size reduction. Solid particle dispersions of the colorant should have a final average particle size of less than 1 µm, more preferable less than 0.1 µm, and most preferable between 0.01 and 0.1 µm as solid colorant particles having such a sub-µm average size provide the best pigment utilization and a reduction in unwanted light absorption compared to pigments with a particle size greater than 1.2 µm.

Furthermore in order to end up with a screen, plate or panel ready-for-use in scanners, the flexible plates are advantageously laminated against a more rigid (less flexible, but still flexible enough) carrier. The rigid carrier can be either flat or non flat, e.g. concave or convex at the side to which the flexible plate is laminated onto, and as such it is clear that the scintillator or phosphor plate having been made flexible by the measures as in the present invention is advantageously applied therefore. As a result the flexibility of the said screen, plate or panel ready-for-use in scanners should be optimized in order to avoid the problems set forth in the background of the present invention.

According to the present invention a sheet, web or panel is formed, wherein a laminate onto the flexible-made substrate, carrying the phosphor or scintillator layer in form of a carrier layer is further included, wherein said laminated carrier layer is a less flexible or more rigid layer than the flexible-made phosphor or scintillator support layer. Said carrier layer preferably is a plastic or metal sheet, and even more preferably said carrier layer is a fibre-reinforced plastic sheet or a more rigid metal (aluminum, and more preferred anodized aluminum) sheet than the flexible-made phosphor or scintillator support. Alternatively an amorphous carbon (a-C) layer is an interesting option as well as described in EP-A 03 101 920, filed Jun. 27, 2003, whether or not provided with a mirror-like aluminum layer as disclosed in EP-A 03 101 921, filed Jun. 27, 2003.

According to another embodiment according to the present invention a sheet, web or panel is formed, wherein a laminate in form of a carrier layer is included, and wherein said carrier layer is further applied to the side opposite to the phosphor or scintillator layer, onto the flexible-made phosphor or scintillator support.

The present invention thus provides a phosphor or scintillator support or substrate, having been made flexible as described in the present invention, in a format as large as possible (allowing to be cut in all formats desired), further providing ability to homogeneously deposit phosphor or scintillator material over quite a large screen, sheet, plate or panel surface area. In a practical application phosphor or scintillator screens or panels having a coated length in the range from e.g. 1.00 m up to at least 500 m and a coated width in the range from 0.50 m up to 3 m become available, depending on the dimensions of the sealed zone in the coating apparatus described in EP-Applicatons Nos. 3 100 723, filed Mar. 20, 2003 and 4 101 138, filed Mar. 19, 2004.

Coating onto a large flexible-made substrate, optionally cut into tailor made screen sheets, plates or panels in desired formats, wherein such a cutting procedure may proceed on-line), and subsequently laminated onto a rigid plate, has been made available by the unexpected flexibility of the phosphor layer and the perfect adhesion of the phosphor layer to the flexible-made substrate, characterized by a high flexibility and perfect adhesion, even for phosphor layers having thicknesses up to at least 1 mm.

It is understood that the screens, panels, plates or sheets having such substrates, made flexible as described hereinbefore, are particularly suitable for use as phosphor or scintillator plates, in intensifying screens, in stimulable or storage phosphor screens, suitable for use in high energy radiation detection and image formation and, more particularly, in screen/film radiography, in computed radiography and in direct radiography. In those applications it is clear that the screens, plates or panels are easily mounted in a cassette, where appropriate, thanks to an improved manutention ability of the modified substrate materials, allowing considerable flexibility.

EXAMPLES

While the present invention will hereinafter be described in connection with preferred embodiments thereof, it will be understood that it is not intended to limit the invention to those embodiments.

As an example of a laser cut precision product the LPKF Stencil Laser 800/800 with Turbo Cut is used to produce laser cut precision products. This laser cut machine is designed for the production of fine pitch (SMD) stencils and offers superior quality on round apertures and is offered by Stork Veco.

The material mostly used for the laser cut precision products is Stainless Steel. The products are available to a maximum format up to 800×800 mm with an axis accuracy of +/−5 μm over the cutting area. The accuracy of the laser cut feature dimensions are up to +/−2 μm. With the optional Turbo Cut we can offer you round laser cut holes of 60 μm to 1000 μm diameter, the accuracy in roundness is more than 96%. The high production speed of this technologically superior machine makes short delivery times of the laser cut precision products possible. Electroforming technology furthermore offers considerable advantages compared to etching, punching, laser-cutting and wire-erosion. Those advantages include: extreme high precision, no burrs, no stress, naturally flat products, complex shapes possible, sharp edge definition and excellent reproducibility.

Etching technology offers considerable advantages compared to punching, laser-cutting and wire-erosion. Those advantages include: high precision, ability to virtually etch all metals possible, final product free of burrs, complicated shapes are (re)producible and no deformation of the material. Moreover thicker as well as thin sheets can be processed.

In order to compare the stiffness of flexible supports before and after application of the desired mechanical, chemical, electrochemical, optical techniques or a combination therefrom, samples of the panel are cut into demensions (x cm times y cm, x being less than y), wherein the supports having been made more flexible, are held horizontally in clamping jaws such that one half (½) of the smallest end of each support is covered by the jaws. The vertical deflection of the other end of the sample from the centerline of the clamping jaws is then measured with a ruler.

In order to determine to what extent the support is advantageously made less rigid, it is recommended to optimize the relationship by clamping coatings of differing formats, wherein said coatings have been generated by application of the same coating procedure and wherein it is studied from what format on cracks occur into the coated phosphor layer. Such a procedure is not limited to the phosphor or scintillator layer onto the aluminum substrate support, but can be extended to the phosphor or scintillator layer after having been coated with a moisture protecting coating and, if desired even after having coated an outermost protective layer thereupon.

In particular for radiation image storage panels or scintillator panels for use in flat scanners, the term "radiation image storage panel having a certain rigidity or flexibility" as used herein means that the radiation image storage panel has a level of rigidity/flexibility such that the amount of deflection of a portion of the radiation image storage panel by gravity, which portion extends over a distance (ordinarily within a range of approximately 50 mm to approximately 200 mm, but not limited thereto if larger formats are envisaged) between radiation image storage panel support members located on both sides of the position that is scanned with the stimulating rays, does not adversely affect the light guiding efficiency.

"Substrate stiffness" is measured by determining bending stiffness by the "Lorentzen and Wettre Stiffness Tester", Model 16D. The output from this instrument is force, expressed in millinewtons (mN), required to effectively bend the free end of a sample having a well-defined format at a certain bending angle (e.g. 15°) from the unloaded position. The figures for the stiffness of the substrate thus obtained can be compared for substrates having the same format. Optimization results from a lot of experimental data for the "stiffness" parameter (for the coated and non-coated substrate supports) and comparison with the performance (inasmuch as the light guiding efficiency of the phosphor or scintillator sheets or panels thus obtained are not adversely affected).

Another experimentally measurable parameter is the "tensile strength" or the "tensile stress" of the flexible-made substrate at which a substrate breaks apart. This is an important conveyance and forming parameter. "Tensile strength" is measured by ASTM D882 procedure and is expressed in MPa. A tensile strength greater than 30 MPa is preferred as substrates less than 30 MPa tend to fracture during conveyance in a scanning apparatus.

The "friction coefficient" of the finished phosphor or scinitllator panel may also form an important factor as it is related to the conveyance in a scanning apparatus. This "friction coefficient" is normally defined as the ratio of the weight of a panel moving on a surface to the force that maintains contact between the said surface and the panel (e.g. in a scanner), and is mathematically expressed as: friction force/normal force. It is commonly measured by using ASTM D-1894 utilizing therefor a stainless steel sled to measure both the static and dynamic "friction coefficient" of the flexible-made substrate.

The coefficient of "static friction" is the value at the time movement between two contacting surfaces is ready to start, but no is actual movement has occurred.

The coefficient of "kinetic friction" refers to the case when the two contacting surfaces are actually sliding against each other at a constant rate of speed.

So the force necessary at the onset of sliding provides a measurement of "static friction coeffient". Pulling one surface over the other contacting surface at a constant speed over a given length provides a measure of "kinetic frictional force".

In practice substrates comprising comprises a sheet having a stiffness of between 20 and 270 mN.

Coefficients of friction between 0.2 and 0.6 were measured for useful substrates, having a tensile strength of at least 34 MPa.

As is apparent to those skilled in the art that numerous modifications can be made without departing from the scope of the invention as defined in the appending claims.

The invention claimed is:

1. A sheet, web or panel, comprising a phosphor or a scintillator layer coated onto a flexible-made support or substrate, the stiffness of which is lowered by presence of pits or grooves onto said substrate wherein said flexible-made support or substrate is selected from ceramic sheets.

2. Sheet, web or panel according to claim 1, wherein said support is made flexible up to an elasticity modulus E of less than 1000 N/mm$^2$, measured as described in DIN 53457.

3. Sheet, web or panel according to claim 1, wherein said substrate has a thickness of up to at most 1000 µm.

4. Sheet, web or panel according to claim 2, wherein said substrate has a thickness of up to at most 1000 µm.

5. Sheet, web or panel according to claim 3, wherein roughness of said substrate is so that an average center line surface roughness (Ra) is in the range from 1 to 10 µm.

6. Sheet, web or panel according to claim 4, wherein roughness of said substrate is so that an average center line surface roughness (Ra) is in the range from 1 to 10 µm.

7. Sheet, web or panel according to claim 5, wherein said roughness is applied on at least one side of said sheet, web or panel.

8. Sheet, web or panel according to claim 6, wherein said roughness is applied on at least one side of said sheet, web or panel.

9. Sheet, web or panel according to claim 1, wherein said phosphor is a prompt emitting luminescent phosphor.

10. Sheet, web or panel according to claim 2, wherein said phosphor is a prompt emitting luminescent phosphor.

11. Sheet, web or panel according to claim 3, wherein said phosphor is a prompt emitting luminescent phosphor.

12. Sheet, web or panel according to claim 4, wherein said phosphor is a prompt emitting luminescent phosphor.

13. Sheet, web or panel according to claim 1, wherein said phosphor is an alkali halide phosphor having phosphor crystals without binder, in form of piles, pillars, pillar-shaped blocks, prisms, needles or tiles.

14. Sheet, web or panel according to claim 2, wherein said phosphor is an alkali halide phosphor having phosphor crystals without binder, in form of piles, pillars, pillar-shaped blocks, prisms, needles or tiles.

15. Sheet, web or panel according to claim 3, wherein said phosphor is an alkali halide phosphor having phosphor crystals without binder, in form of piles, pillars, pillar-shaped blocks, prisms, needles or tiles.

16. Sheet, web or panel according to claim 4, wherein said phosphor is an alkali halide phosphor having phosphor crystals without binder, in form of piles, pillars, pillar-shaped blocks, prisms, needles or tiles.

17. Sheet, web or panel according to claim 13, wherein said phosphor is a needle-shaped CsBr:Eu phosphor.

18. Sheet, web or panel according to claim 14, wherein said phosphor is a needle-shaped CsBr:Eu phosphor.

19. Sheet, web or panel according to claim 15, wherein said phosphor is a needle-shaped CsBr:Eu phosphor.

20. Sheet, web or panel according to claim 16, wherein said phosphor is a needle-shaped CsBr:Eu phosphor.

21. Sheet, web or panel according to claim 1, wherein a layer of parylene is in contact with the said phosphor or scintillator layer, at one or both sides thereof.

22. Sheet, web or panel according to claim 2, wherein a layer of parylene is in contact with the said phosphor or scintillator layer, at one or both sides thereof.

23. Sheet, web or panel according to claim 3, wherein a layer of parylene is in contact with the said phosphor or scintillator layer, at one or both sides thereof.

24. Sheet, web or panel according to claim 4, wherein a layer of parylene is in contact with the said phosphor or scintillator layer, at one or both sides thereof.

25. Sheet, web or panel according to claim 17, wherein a layer of parylene is in contact with the said phosphor or scintillator layer, at one or both sides thereof.

26. Sheet, web or panel according to claim 18, wherein a layer of parylene is in contact with the said phosphor or scintillator layer, at one or both sides thereof.

27. Sheet, web or panel according to claim 19, wherein a layer of parylene is in contact with the said phosphor or scintillator layer, at one or both sides thereof.

28. Sheet, web or panel according to claim 20, wherein a layer of parylene is in contact with the said phosphor or scintillator layer, at one or both sides thereof.

29. Sheet, web or panel according to claim 25, wherein a protective outermost coating is further provided, farther from the support than the phosphor layer.

30. Sheet, web or panel according to claim 26, wherein a protective outermost coating is further provided, farther from the support than the phosphor layer.

31. Sheet, web or panel according to claim 27, wherein a protective outermost coating is further provided, farther from the support than the phosphor layer.

32. Sheet, web or panel according to claim 28, wherein a protective outermost coating is further provided, farther from the support than the phosphor layer.

33. Sheet, web or panel comprising a phosphor or a scintillator layer coated onto a flexible-made support or substrate, the stiffness of which is lowered by presence of pits or grooves onto said substrate wherein a laminate onto the flexible-made substrate carrying the phosphor or scintillator layer in form of a carrier layer is further included, wherein said carrier layer is a less flexible or more rigid layer than the flexible-made phosphor or scintillator support layer.

34. Sheet, web or panel according to claim 32, wherein said flexible-made support or substrate is selected from the group consisting of metal sheets, plastic sheets, reinforced resin sheets, inorganic glass and ceramic sheets.

35. Sheet, web or panel according to claim 33, wherein said support is made flexible up to an elasticity modulus E of less than 1000 N/mm$^2$, measured as described in DIN 53457.

36. Sheet, web or panel according to claim 34 wherein said support is made flexible up to an elasticity modulus E of less than 1000 N/mm$^2$, measured as described in DIN 53457.

37. Sheet, web or panel comprising a phosphor or a scintillator layer coated onto a flexible-made support or substrate, the stiffness of which is lowered by presence of pits or grooves onto said substrate wherein a laminate in form of a carrier layer is included, and wherein said carrier layer is further applied to the side opposite to the phosphor or scintillator layer on the flexible-made phosphor or scintillator support.

38. Sheet, web or panel according to claim 37 wherein said flexible-made support or substrate is selected from the group consisting of metal sheets, plastic sheets, reinforced resin sheets, inorganic glass and ceramic sheets.

39. Sheet, web or panel according to claim 37 wherein said support is made flexible up to an elasticity modulus E of less than 1000 N/mm$^2$, measured as described in DIN 53457.

40. Sheet, web or panel according to claim 38 wherein said support is made flexible up to an elasticity modulus E of less than 1000 N/mm$^2$, measured as described in DIN 53457.

41. Method of preparing a sheet, web or panel according to claim 33, wherein said pits or grooves are applied by a technique selected from the group consisting of mechanical, chemical, optical, electrical and photo-etching techniques.

42. Method of preparing a sheet, web or panel according to claim 34, wherein said pits or grooves are applied by a technique selected from the group consisting of mechanical, chemical, optical, electrical and photo-etching techniques.

43. Method of preparing a sheet, web or panel according to claim 35, wherein said pits or grooves are applied by a technique selected from the group consisting of mechanical, chemical, optical, electrical and photo-etching techniques.

44. Method of preparing a sheet, web or panel according to claim 36, wherein said pits or grooves are applied by a technique selected from the group consisting of mechanical, chemical, optical, electrical and photo-etching techniques.

* * * * *